United States Patent
Sakata et al.

(10) Patent No.: US 8,338,535 B2
(45) Date of Patent: *Dec. 25, 2012

(54) EPOXY RESINS, CURING AGENT AND (CO)POLY(METHYL METHACRYLATE) BLOCK COPOLYMER

(75) Inventors: Hiroaki Sakata, Ehime (JP); Nobuyuki Tomioka, Ehime (JP); Shiro Honda, Ehime (JP)

(73) Assignee: Toray Industries, Inc., Tokyo (JP)

( * ) Notice: Subject to any disclaimer, the term of this patent is extended or adjusted under 35 U.S.C. 154(b) by 241 days.

This patent is subject to a terminal disclaimer.

(21) Appl. No.: 12/306,629

(22) PCT Filed: Jun. 25, 2007

(86) PCT No.: PCT/JP2007/062665
§ 371 (c)(1),
(2), (4) Date: Dec. 24, 2008

(87) PCT Pub. No.: WO2008/001705
PCT Pub. Date: Jan. 3, 2008

(65) Prior Publication Data
US 2009/0198012 A1    Aug. 6, 2009

(30) Foreign Application Priority Data
Jun. 30, 2006   (JP) .................. 2006-180990

(51) Int. Cl.
| B29D 23/00 | (2006.01) |
| B32B 1/08 | (2006.01) |
| B32B 27/04 | (2006.01) |
| B32B 27/12 | (2006.01) |
| C08L 63/02 | (2006.01) |

(52) U.S. Cl. ............... 525/92 H; 428/36.4; 428/297.4; 428/300.7; 525/89; 525/92 D; 525/92 E; 525/92 F

(58) Field of Classification Search ............. None
See application file for complete search history.

(56) References Cited

U.S. PATENT DOCUMENTS
5,302,666 A * 4/1994 Hino et al. ............ 525/113
6,573,309 B1   6/2003 Reitenbach et al.
6,894,113 B2 * 5/2005 Court et al. ............ 525/88

2004/0034124 A1   2/2004 Court et al.
2004/0039120 A1 * 2/2004 Takeyama et al. ......... 525/107
2004/0101689 A1   5/2004 Valette
2007/0078236 A1 * 4/2007 Bonnet et al. ............ 525/529
2008/0051511 A1 * 2/2008 Guerret et al. ........... 525/92 F FOREIGN PATENT DOCUMENTS
| EP | 0 449 359 A2 | 10/1991 |
| EP | 1 163 288 B1 | 5/2003 |
| GB | 1 410 775 A | 10/1975 |
| JP | 4-211419 A | 8/1992 |
| JP | 6-345884 A * | 12/1994 |
| JP | 7-149952 A | 6/1995 |
| JP | 7-150042 A | 6/1995 |
| JP | 9-227763 A | 9/1997 |
| JP | 2000-309655 A | 11/2000 |
| JP | 2003-2990 A * | 1/2003 |
| JP | 2007-154160 A * | 6/2007 |
| JP | 2007-154160 A | 6/2007 |
| WO | WO 01/92415 A1 | 12/2001 |
| WO | WO 2005/073314 A1 | 8/2005 |

OTHER PUBLICATIONS

"Modern Adhesive Technology Manual", Jan. 2002, vol. 1, pp. 96 with partial translation.
Resin and Plastics, "Encyclopedia of Industrial Chemistry", Jan. 2003, vol. 1, pp. 314 with partial translation.

* cited by examiner

*Primary Examiner* — Robert Sellers
(74) *Attorney, Agent, or Firm* — Birch, Stewart, Kolasch & Birch, LLP

(57) ABSTRACT

The present invention relates to an epoxy resin composition comprising the following [A], [A'], [B], and [C]: [A] a bisphenol-type epoxy resin having a glass transition temperature or melting point of 50° C. or higher; [A'] an epoxy resin which is in a liquid state at 25° C.; [B] an epoxy resin curing agent; and [C] at least one block copolymer selected from the group consisting of S-B-M, B-M, and M-B-M, wherein the blocks are linked to each other by a covalent bond or by an intermediate molecule bound to one of the blocks via one covalent bond formation and to the other block via another covalent bond formation; the block M is a methyl methacrylate homopolymer or a copolymer comprising at least 50% by weight of methyl methacrylate; the block B is incompatible with the block M and has a glass transition temperature of 20° C. or lower; and the block S is incompatible with the blocks B and M and has a glass transition temperature higher than that of the block B, a prepreg obtained by impregnating a fiber base with the epoxy resin composition, and a fiber-reinforced composite material obtained by curing the prepreg.

11 Claims, 1 Drawing Sheet

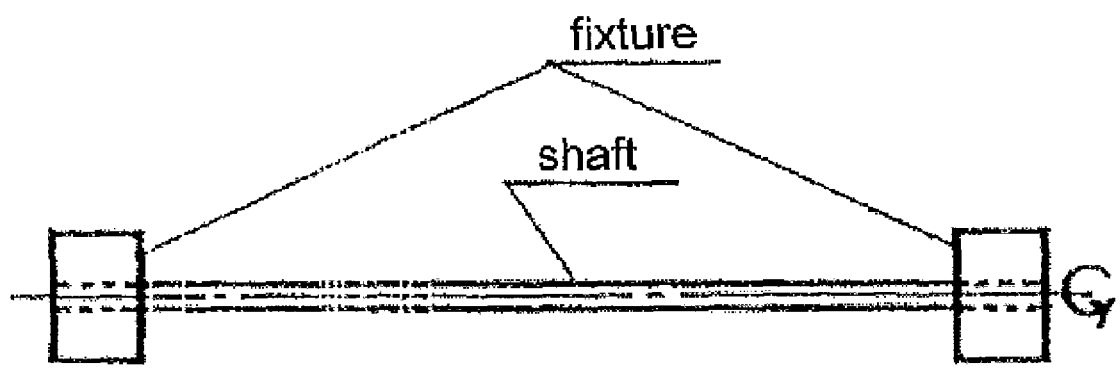

EPOXY RESINS, CURING AGENT AND (CO)POLY(METHYL METHACRYLATE) BLOCK COPOLYMER

TECHNICAL FIELD

The present invention relates to a fiber-reinforced composite material suitable for sport and general industrial applications, a prepreg for obtaining this fiber-reinforced composite material, and an epoxy resin composition preferably used as a matrix resin thereof.

BACKGROUND ART

In recent years, reinforcing fiber composite materials obtained using reinforcing fibers such as carbon or aramid fibers have been utilized in structural materials for aircrafts or automobiles, sport and general industrial applications such as tennis rackets, golf shafts, and fishing rods, etc., by use of their high specific strength and specific modulus. Methods using a prepreg, which is an intermediate base in a sheet form comprising a reinforcing fiber impregnated with an uncured thermosetting or energy ray-curable matrix resin, are often used as methods for producing these fiber-reinforced composite materials. An epoxy resin is often used as the matrix resin used in this prepreg in terms of processability and handleability.

The matrix resin composed of the epoxy resin exhibits excellent heat resistance and favorable mechanical properties. However, a composite material prepared from this matrix resin sometimes has low impact resistance due to lower elongation and/or toughness of the epoxy resin than those of a thermoplastic resin. Therefore, improvement in these properties has been demanded.

For example, methods which involve formulating a rubber or thermoplastic resin having excellent toughness have heretofore been attempted as methods for improving the toughness of an epoxy resin. For example, studies on the formulation of a rubber such as an acrylonitrile-butadiene rubber having a carboxyl terminus into an epoxy resin have been conducted since the 1970s and well known in general. However, such a rubber has much lower physical properties such as a modulus of elasticity and a glass transition temperature than those of an epoxy resin. Therefore, the formulation of the rubber exhibits a reduced modulus of elasticity or glass transition temperature in the epoxy resin. Thus, it was difficult to keep a balance between the improvement in toughness and the modulus of elasticity or glass transition temperature. In another case, a particulate rubber such as a core-shell rubber is used for improving this disadvantage. However, the formulation of such a rubber in an amount increased for sufficiently improving toughness may exhibit a reduced modulus of elasticity or glass transition temperature in the epoxy resin.

Moreover, according to a known method for formulating a thermoplastic resin into an epoxy resin (see e.g., Patent Document 1), toughness is improved without impairing the mechanical properties of an epoxy resin by dissolving a thermoplastic resin such as polyether sulfone, polysulfone, and polyetherimide in the epoxy resin or formulating a fine powder of the thermoplastic resin into the epoxy resin to thereby uniformly disperse the thermoplastic resin in the epoxy resin. However, this method requires formulating the thermoplastic resin in large amounts. The formulation of the thermoplastic resin in large amounts may significantly increase the viscosity of the epoxy resin composition, resulting in a processability or handleability problem.

In recent years, studies have been conducted on improvement in toughness or impact resistance using a block copolymer composed of a diblock or triblock. For example, a method for improving toughness using a styrene-butadiene-methacrylic acid or butadiene-methacrylic acid copolymer has been proposed (see e.g., Patent Document 2). In this method, the effect of improving toughness has been confirmed in a combination using a bisphenol A-type epoxy resin as an epoxy resin which is in a liquid state at room temperature and 4,4'-methylenebis(3-chloro-2,6-diethylaniline) as a curing agent. Moreover, the reduction of heat resistance is kept as low as a few to a dozen ° C. However, the effect of improving toughness is still insufficient.

Patent Document 1: JP Patent Publication (Kokoku) No. 6-43508B (1994)
Patent Document 2: JP Patent Publication (Kohyo) No. 2003-535181A

DISCLOSURE OF THE INVENTION

Problems to be Solved by the Invention

An object of the present invention is to improve the disadvantages of the conventional techniques and to provide an epoxy resin composition that gives a cured article having excellent heat resistance and high toughness.

Means for Solving the Problems

To attain the object, an epoxy resin composition of the present invention is constituted as described below. Specifically, the epoxy resin composition of the present invention comprises the following [A], [A'], [B], and [C]:

[A] a bisphenol-type epoxy resin having a glass transition temperature or melting point of 50° C. or higher;
[A'] an epoxy resin which is in a liquid state at 25° C.;
[B] an epoxy resin curing agent; and
[C] at least one block copolymer selected from the group consisting of S-B-M, B-M, and M-B-M, wherein the blocks are linked to each other by a covalent bond or by an intermediate molecule bound to one of the blocks via one covalent bond formation and to the other block via another covalent bond formation; the block M is a methyl methacrylate homopolymer or a copolymer comprising at least 50% by weight of methyl methacrylate; the block B is incompatible with the block M and has a glass transition temperature of 20° C. or lower; and the block S is incompatible with the blocks B and M and has a glass transition temperature higher than that of the block B.

A prepreg of the present invention is obtained by impregnating a fiber base with the epoxy resin composition.

A fiber-reinforced composite material of the present invention is obtained by curing the prepreg.

A fiber-reinforced composite article in a cylindrical form of the present invention is obtained by curing the prepreg in a cylindrical form.

Advantages of the Invention

According to the present invention, an epoxy resin composition having high toughness and excellent processability for obtaining a prepreg can be obtained. Moreover, a fiber-reinforced composite material obtained by the present invention is excellent in toughness and impact resistance.

BEST MODE FOR CARRYING OUT THE INVENTION

A component [A] in the present invention is a component that is necessary for enhancing the compatibility of an epoxy resin component (epoxy resin component in a liquid state generally used in a prepreg) with a component [C] in a composition and imparting impact resistance to the epoxy resin composition. The component [A] is a bisphenol-type epoxy resin having a glass transition temperature or melting point of 50° C. or higher.

The glass transition temperature (hereinafter, also referred to as Tg) described herein refers to a temperature at the midpoint of glass transition determined using a differential scanning calorimeter (DSC) according to JIS K7121 (1987). The melting point described herein refers to a temperature at a melting peak determined according to JIS K7121 (1987).

The bisphenol-type epoxy resin is obtained through a reaction with epichlorohydrin using bisphenol A, bisphenol F, bisphenol AD, bisphenol S, or a halogen or alkyl substitution product of these bisphenols as a raw material or a polycondensate of some of these bisphenols as a raw material. The bisphenol-type epoxy resin may be used alone. Alternatively, some bisphenol-type epoxy resins of different types may be used in combination.

Moreover, the component [A] that is preferably used has a molecular weight of 700 to 10000, more preferably a molecular weight between 1000 and 5000 inclusive. When the molecular weight is less than 700, the component [C] may undergo coarse phase separation due to insufficient compatibility attributed to a small number of repeating units. Thus, the toughness of the resin may hardly be reflected in mechanical properties. When the molecular weight exceeds 10000, workability is reduced due to high viscosity of the composition. In this context, the molecular weight described in the present invention refers to a number-average molecular weight obtained by gel-permeation chromatography. The number-average molecular weight can be measured according to, for example, a method which involves measuring the retention time of 0.3 μL of an injected sample at a flow rate of 1 mL/min using two Shodex 80M (registered trademark, manufactured by Showa Denko K.K.) columns and one Shodex 802 (manufactured by Showa Denko K.K.) column and converting the retention time to a molecular weight using the retention time of a polystyrene sample for calibration. In this context, when plural peaks are observed in liquid chromatography, the component of interest is separated, and individual peaks can be converted to a molecular weight.

The epoxy resin composition preferably comprises at least 10 parts by weight of these epoxy resins as the component [A] with respect to 100 parts by weight in total of epoxy resins. Alternatively, the component [A] is contained in the range of more preferably between 10 parts by weight and 80 parts by weight inclusive, most preferably between 10 parts by weight and 60 parts by weight inclusive, from the viewpoint of the flowability of the epoxy resin composition.

Examples of commercially available products of such a bisphenol A-type epoxy resin include Epikote (registered trademark) 1001, Epikote 1002, Epikote 1003, Epikote 1004, Epikote 1004AF, Epikote 1007, and Epikote 1009 (all manufactured by Japan Epoxy Resin Co., Ltd.). Examples of a brominated bisphenol A-type epoxy resin include Epikote 5050, Epikote 5054, and Epikote 5057 (all manufactured by Japan Epoxy Resin Co., Ltd.).

Examples of commercially available products of the bisphenol F-type epoxy resin include Epikote 4002, Epikote 4004P, Epikote 4007P, and Epikote 4009P (all manufactured by Japan Epoxy Resin Co., Ltd.), and Epotohto (registered trademark) YDF2001 and Epotohto YDF2004 (all manufactured by Tohto Kasei Co., Ltd.). Examples of a tetramethyl bisphenol F-type epoxy resin include YSLV-80XY (manufactured by Nippon Steel Chemical Co., Ltd.).

Examples of the bisphenol S-type epoxy resin include Epiclon (registered trademark) EXA-1514 (manufactured by Dainippon Ink & Chemicals Inc.).

An epoxy resin curing agent as a component [B] in the present invention is a component that is necessary for curing the epoxy resin. Examples thereof include dicyandiamide or a derivative thereof, aromatic amine, alicyclic amine, acid anhydride, and aliphatic amine curing agents, and phenols. Preferable examples thereof include dicyandiamide or a derivative thereof. The dicyandiamide derivative is a compound obtained through a reaction using at least one of the amino, imino, and cyano groups. The dicyandiamide derivative is, for example, o-tolylbiguanide, diphenylbiguanide, or a product of a preliminary reaction of the amino, imino, or cyano group of dicyandiamide with the epoxy group of the epoxy compound used in the epoxy resin composition. Examples of the aromatic amine curing agent include m-phenylenediamine, diaminodiphenylmethane, m-xylenediamine, and various derivatives or isomers thereof. Examples of the alicyclic amine curing agent include isophoronediamine. Examples of the acid anhydride curing agent include methyl nadic anhydride, tetrahydrophthalic anhydride, methyltetrahydrophthalic anhydride, and methylhexahydrophthalic anhydride. Examples of the aliphatic amine curing agent include triethylenetetramine. Examples of the phenols include bisphenol S and trisphenol methane.

The amount of the component [B] formulated is preferably 0.6 to 1.4 equivalents with respect to the active hydrogen equivalent of all epoxy groups in the epoxy resin composition from the viewpoint of heat resistance and mechanical properties. The amount of the component [B] formulated is preferably 1 to 15 parts by weight with respect to 100 parts by weight in total of epoxy resins in the epoxy resin composition. The amount of the component [B] formulated is more preferably between 1 part by weight and 10 parts by weight inclusive. The epoxy resin curing agent is preferably formulated in a powder form in the resin from the viewpoint of storage stability at room temperature and viscosity stability in prepreg preparation. In the present invention, the epoxy resin curing agent has an average particle size of preferably 10 μm or smaller, more preferably 5 μm or smaller. When the average particle size exceeds 10 μm, the resulting epoxy resin curing agent, for example, when used in prepreg applications, may fail to enter into reinforcing fiber bundles even by pressure impregnation.

Examples of commercially available products of the dicyandiamide include DICY-7 and DICY-15 (all manufactured by Japan Epoxy Resin Co., Ltd.).

Dicyandiamide may be used alone or may be used in combination with a curing catalyst of dicyandiamide or other epoxy resin curing agents. Examples of the curing catalyst of dicyandiamide combined therewith include ureas, imidazoles, and Lewis acid catalysts. Examples of the other epoxy resin curing agents combined therewith include aromatic amine, alicyclic amine, and acid anhydride curing agents. Examples of commercially available products of the ureas include DCMU99 (manufactured by Hodogaya Chemical Co., Ltd.), and Omicure 24, Omicure 52, and Omicure 94 (all manufactured by CVC Specialty Chemicals, Inc.). Examples of commercially available products of the imidazoles include 2MZ, 2PZ, and 2E4MZ (all manufactured by Shikoku Chemicals Corp.). Examples of the Lewis acid catalysts include complexes of boron halides with bases such as a boron trifluoride/piperidine complex, a boron trifluoride/monoethylamine complex, a boron trifluoride/triethanolamine complex, and a boron trichloride/octylamine complex.

A block copolymer [C] in the present invention is a component that is essential for improving toughness and impact resistance while maintaining the excellent heat resistance of the epoxy resin composition. The component [C] is at least one block copolymer selected from the group consisting of S-B-M, B-M, and M-B-M. In this context, the blocks are linked to each other by a covalent bond or by an intermediate molecule bound to one of the blocks via one covalent bond formation and to the other block via another covalent bond formation.

The block M is a methyl methacrylate homopolymer or a copolymer comprising at least 50% by weight of methyl methacrylate.

The block B is incompatible with the block M and has a glass transition temperature of 20° C. or lower.

The block S is incompatible with the blocks B and M and has a glass transition temperature higher than that of the block B.

Moreover, it is preferred from the viewpoint of improvement in toughness that any of the blocks S, B, and M should be compatible with the epoxy resin. In the present invention, this compatibility of any of the blocks can be confirmed from solubility in an uncured epoxy resin. Moreover, when all the blocks are incompatible with the epoxy resin, they are insoluble in an uncured epoxy resin. This solubility or insolubility can be confirmed, for example, by adding 0.1 parts by weight of the block copolymer of interest to 100 parts by weight of any epoxy resin and examining whether the block copolymer is dissolved in the epoxy resin during stirring in an oil bath at 150 to 180° C. for 2 hours.

Any methyl methacrylate homopolymer or any copolymer comprising at least 50% by weight of methyl methacrylate can be used as the block M in the diblock copolymer B-M as the block copolymer [C]. Preferably, the block M is composed of a methyl methacrylate monomer or comprises at least 50% by weight, more preferably at least 75% by weight of methyl methacrylate.

The other monomers that can constitute this block M may or may not be acrylic monomers and may or may not be reactive monomers. In this context, the reactive monomer means a monomer having a chemical group capable of reacting with the oxirane group of the epoxy molecule or with the chemical group of the curing agent. Specific examples of such a chemical group can include, but not limited to, reactive functional groups such as an oxirane, amine, or carboxyl group. The reactive monomer can be (meth)acrylic acid or any of other hydrolyzable monomers resulting in this acid. The reactive monomer is preferably used for improving compatibility with the epoxy resin and adherability at the epoxy-block copolymer interface.

Examples of the other monomers that can constitute the block M include glycidyl methacrylate or tert-butyl methacrylate. It is preferred that the block M is composed of syndiotactic PMMA (polymethyl methacrylate) to at least 60% by weight.

The block B has a Tg of 20° C. or lower, preferably 0° C. or lower, more preferably −40° C. or lower. The lower Tg is more preferable from the viewpoint of toughness. However, when the Tg is lower than −100° C., a processability problem may be caused, such as a rough cutting surface of the resulting fiber-reinforced composite material.

The block B is preferably an elastomer block. A monomer used for synthesizing the elastomer block can be diene selected from butadiene, isoprene, 2,3-dimethyl-1,3-butadiene, 1,3-pentadiene, and 2-phenyl-1,3-butadiene.

This block B is preferably selected from among polydienes, particularly, polybutadiene, polyisoprene, and random copolymers thereof, and partially or completely hydrogenated polydienes from the viewpoint of toughness. Examples of the polybutadiene include 1,2-polybutadiene (Tg: approximately 0° C.). For example, 1,4-polybutadiene (Tg: approximately −90° C.) having the lowest Tg is used more preferably. This is because the use of the block B having a lower Tg is advantageous from the viewpoint of impact resistance and toughness. The block B may be hydrogenated. This hydrogenation is performed according to a usual method.

The monomer used for synthesizing the elastomer as the block B can be alkyl (meth)acrylate. Specific examples thereof can include ethyl acrylate (−24° C.), butyl acrylate (−54° C.), 2-ethylhexyl acrylate (−85° C.), hydroxyethyl acrylate (−15° C.), and 2-ethylhexyl methacrylate (−10° C.). In this context, the numeric value shown in the parentheses following the name of each (meth)acrylate represents the Tg of the block B obtained using the (meth)acrylate. Among them, butyl acrylate is preferably used.

To satisfy the condition that the block B is incompatible with the block M, the (meth)acrylate used as the monomer for synthesizing this block B is different from that for the block M. This block B is preferably composed predominantly of 1,4-polybutadiene or of poly(butyl acrylate) or poly(2-ethylhexyl acrylate).

The block M in the triblock copolymer M-B-M can be selected from the homopolymers and copolymers serving as the block M in the diblock copolymer B-M. Two blocks M in the triblock copolymer M-B-M may be the same as or different from each other. Moreover, these two blocks M can also be synthesized from the same monomers and differ in molecular weight. When the triblock copolymer M-B-M and the diblock copolymer B-M are combined, the block M in the triblock copolymer M-B-M may be the same as or different from that in the diblock copolymer B-M.

This block B can be selected from the elastomer blocks serving as the block B in the diblock copolymer B-M. When the triblock copolymer M-B-M and the diblock copolymer B-M are combined, the block B in the triblock copolymer M-B-M may be the same as or different from that in the diblock copolymer B-M.

The block M in the triblock copolymer S-B-M can be selected from the homopolymers and copolymers serving as the block M in the diblock copolymer B-M. The block M in this triblock copolymer S-B-M, each block M in the triblock copolymer M-B-M, and the block M in the diblock copolymer B-M may be the same as or different from one another. The block B in the triblock copolymer S-B-M can be selected from the elastomer blocks serving as the block B in the diblock copolymer B-M.

The blocks B in the triblock copolymer S-B-M, in the triblock copolymer M-B-M, and in the diblock copolymer B-M may be the same as or different from one another.

The block S is incompatible with the blocks B and M and has a glass transition temperature higher than that of the block B. The block S has a Tg or melting point of preferably 23° C. or higher, more preferably 50° C. or higher. Examples of the block S can include those obtained from aromatic vinyl compounds, for example, styrene, α-methylstyrene, or vinyl toluene, and those obtained from alkyl acrylate and/or methacrylate having 1 to 18 carbon atoms in the alkyl chain. In the latter case, to satisfy the condition that the blocks S and M are incompatible with each other, the acrylate is different from that for the block M.

The block copolymer used as the material of the present invention can be produced by anionic polymerization and can be produced according to, for example, the method described in European Patent No. EP524,054 or EP749,987.

Specific examples of the triblock copolymer M-B-M include methyl methacrylate-butyl acrylate-methyl methacrylate copolymers Nanostrength (registered trademark) M22 and Nanostrength M22N having a reactive functional group (all manufactured by Arkema, Inc.). Specific examples of the triblock copolymer S-B-M include styrene-butadiene-methyl methacrylate copolymers Nanostrength 123, Nanostrength 250, Nanostrength 012, Nanostrength E20F, and Nanostrength E40F (all manufactured by Arkema, Inc.).

These block copolymers as the component [C] are contained in an amount preferably between 0.1 parts by weight and 30 parts by weight inclusive, more preferably between 0.5 parts by weight and 20 parts by weight inclusive, even more preferably between 1 part by weight and 15 parts by weight inclusive, with respect to 100 parts by weight in total of epoxy resins including the component [A] and epoxy resins other than the component [A] (including the component [A']). When the amount of the component [C] formulated is less than 0.1 parts by weight, improvement in toughness may be insufficient. When the amount of the component [C] formulated exceeds 30 parts by weight, workability is reduced due to high viscosity of the composition.

Moreover, the epoxy resin composition of the present invention can be supplemented with an epoxy resin as the component [A'] which is in a liquid state at 25° C. and, optionally, an epoxy resin other than the components [A] and [A'] for the purpose of improving workability by adjusting the viscoelasticity of an uncured article or of improving the modulus of elasticity and heat resistance of a cured resin. These epoxy resins of one kind may be added. Alternatively, some epoxy resins of different kinds may be added in combination. Specific examples thereof include a bisphenol A-type epoxy resin which is in a liquid state at 25° C., a bisphenol F-type epoxy resin which is in a liquid state at 25° C., a resorcinol-type epoxy resin, a phenol novolac-type epoxy resin, a cresol novolac epoxy resin, a phenol aralkyl-type epoxy resin, a dicyclopentadiene-type epoxy resin, an epoxy resin having a biphenyl skeleton, and urethane-and isocyanate-modified epoxy resins.

Examples of commercially available products of the bisphenol A-type epoxy resin which is in a liquid state at 25° C. include Epikote (registered trademark) 825, Epikote 826, Epikote 827, Epikote 828, and Epikote 834 (all manufactured by Japan Epoxy Resin Co., Ltd.), Epiclon (registered trademark) 850 (manufactured by Dainippon Ink & Chemicals Inc.), Epotohto (registered trademark) YD-128 (manufactured by Tohto Kasei Co., Ltd.), DER-331 and DER-332 (all manufactured by the Dow Chemical Company), and ARALDITE (registered trademark) LY556 (manufactured by Huntsman Advanced Materials).

Examples of commercially available products of the bisphenol F-type epoxy resin which is in a liquid state at 25° C. include Epikote 806, Epikote 807, and Epikote 1750 (all manufactured by Japan Epoxy Resin Co., Ltd.), Epiclon 830 (manufactured by Dainippon Ink & Chemicals Inc.), and Epotohto YD-170 and Epotohto YD-175 (all manufactured by Tohto Kasei Co., Ltd.).

Examples of the epoxy resin other than the components [A] and [A'] include a resorcinol-type epoxy resin, a phenol novolac-type epoxy resin, a cresol novolac epoxy resin, a phenol aralkyl-type epoxy resin, a dicyclopentadiene-type epoxy resin, an epoxy resin having a biphenyl skeleton, and urethane-and isocyanate-modified epoxy resins.

Examples of commercially available products of the phenol novolac-type epoxy resin include Epikote 152 and Epikote 154 (all manufactured by Japan Epoxy Resin Co., Ltd.), and Epiclon N-740, Epiclon N-770, and Epiclon N-775 (all manufactured by Dainippon Ink & Chemicals Inc.).

Examples of commercially available products of the cresol novolac-type epoxy resin include Epiclon N-660, Epiclon N-665, Epiclon N-670, Epiclon N-673, and Epiclon N-695 (all manufactured by Dainippon Ink & Chemicals Inc.), and EOCN-1020, EOCN-102S, and EOCN-104S (all manufactured by Nippon Kayaku Co., Ltd.).

Specific examples of the resorcinol-type epoxy resin include Denacol (registered trademark) EX-201 (manufactured by Nagase ChemteX Corp.).

Examples of commercially available products of the dicyclopentadiene-type epoxy resin include Epiclon HP7200, Epiclon HP7200L, and Epiclon HP7200H (all manufactured by Dainippon Ink & Chemicals Inc.), Tactix 558 (manufactured by Huntsman Advanced Materials), and XD-1000-1L and XD-1000-2L (all manufactured by Nippon Kayaku Co. Ltd.).

Examples of commercially available products of the phenol aralkyl-type epoxy resin include NC-2000 (manufactured by Nippon Kayaku Co., Ltd.).

Examples of commercially available products of the epoxy resin having a biphenyl skeleton include Epikote YX4000H, Epikote YX4000, and Epikote YL6616 (all manufactured by Japan Epoxy Resin Co., Ltd.), and NC-3000 (manufactured by Nippon Kayaku Co., Ltd.).

Examples of commercially available products of the urethane-and isocyanate-modified epoxy resins include AER 4152 (manufactured by Asahi Kasei Epoxy Co., Ltd.) and ACR 1348 (manufactured by Asahi Denka Kogyo K.K.), which have an oxazolidone ring.

These epoxy resins other than the component [A] are added in an amount of preferably 10 to 90 parts by weight with respect to 100 parts by weight in total of epoxy resins including the component [A] and the epoxy resins other than the component [A] (hereinafter, also referred to as in total of the epoxy resins). When these epoxy resins other than the component [A] are added in an amount exceeding 90 parts by weight, the compatibility of the component [C] may be reduced. The epoxy resins other than the component [A], when applied to a prepreg described later, are contained in an amount preferably between 20 parts by weight and 90 parts by weight inclusive, more preferably between 40 parts by weight and 90 parts by weight inclusive, from the viewpoint of tackiness and drapability.

Moreover, the epoxy resin composition of the present invention can be supplemented with a thermoplastic resin soluble in the epoxy resin for the purpose of adjusting viscosity or stabilizing a phase separation structure. Examples of such a thermoplastic resin include polypropylene, polybutyl terephthalate, ABS, polyamide, polyethylene terephthalate, polymethacrylate, polyvinyl acetal resins, polyacetal, polycarbonate, polyimide, polyphenylene oxide, polyether ketone, polysulfone, polyphenylene sulfide, polyamide imide, polyether sulfone, polyetheretherketone, and polyetherimide. These thermoplastic resins may be used alone or used as a polymer alloy in combination of some of them.

Such a thermoplastic resin has a molecular weight of preferably 5000 to 2000000. When the molecular weight is less than 5000, sufficient compatibility is not obtained depending on the type of the component [A] or [B] combined therewith. Thus, the component [C] may undergo coarse phase separation. When the molecular weight exceeds 2000000, the thermoplastic resin even in small amounts increases viscosity too much. Therefore, the resulting prepreg may have reduced tackiness and drapability.

When heat resistance exceeding 180° C. is desired, polyether sulfone or polyetherimide is preferably used. Specific examples of the polyether sulfone include Sumika Excel (registered trademark) 3600P (average molecular weight: 16400), Sumika Excel 5003P (average molecular weight: 30000), Sumika Excel 5200P (average molecular weight: 35000), and Sumika Excel 7600P (average molecular weight: 45300) (all manufactured by Sumitomo Chemical Co., Ltd.). Specific examples of the polyetherimide include ULTEM 1000 (average molecular weight: 32000), ULTEM 1010 (average molecular weight: 32000), and ULTEM 1040 (average molecular weight: 20000) (all manufactured by GE Plastics).

The polyvinyl acetal resins and the polymethacrylate are easily dissolved in the epoxy resin by heating and improve the adherability of the epoxy resin composition to a reinforcing fiber without impairing the heat resistance of a cured article. In addition, their viscosity is easily adjusted by selecting the molecular weight or adjusting the formulated amount. Therefore, these resins are preferably used.

Specific examples of the polyvinyl acetal resins include: polyvinyl formal such as Vinylec (registered trademark) K (average molecular weight: 59000), Vinylec L (average molecular weight: 66000), Vinylec H (average molecular weight: 73000), and Vinylec E (average molecular weight: 126000) (all manufactured by Chisso Corp.); polyvinyl acetal such as S-LEC (registered trademark) K (manufactured by Sekisui Chemical Co., Ltd.); and polyvinyl butyral such as S-LEC B (manufactured by Sekisui Chemical Co., Ltd.) and Denka Butyral (manufactured by Denki Kagaku Kogyo K.K.). Specific examples of the polymethacrylate include polymethyl methacrylate such as DIANAL (registered trademark) BR-85 (average molecular weight: 280000), DIANAL BR-83 (average molecular weight: 40000), DIANAL BR-87 (average molecular weight: 25000), DIANAL BR-88 (average molecular weight: 480000), and DIANAL BR-108 (average molecular weight: 550000) (all manufactured by Mitsubishi Rayon Co., Ltd.), and Matsumoto Microsphere M (average molecular weight: 1000000), Matsumoto Microsphere M100, and Matsumoto Microsphere M500 (all manufactured by Matsumoto Yushi-Seiyaku Co., Ltd.).

Moreover, the epoxy resin composition of the present invention can be supplemented with various modifiers for improving the viscoelasticity of an uncured resin, the toughness of a cured resin, etc. Specifically, organic or inorganic particles such as rubber particles and thermoplastic resin particles can be formulated therein.

Cross-linked rubber particles and core-shell rubber particles obtained by graft-polymerizing, onto cross-linked rubber particle surface, a polymer of different species are preferably used as the rubber particles from the viewpoint of handleability, etc.

Examples of commercially available products of the cross-linked rubber particles that can be used include FX501P (manufactured by Japan Synthetic Rubber Co., Ltd.) comprising a crosslink of a carboxyl-modified butadiene-acrylonitrile copolymer, and CX-MN series (manufactured by Nippon Shokubai Co., Ltd.) and YR-500 series (manufactured by Tohto Kasei Co., Ltd.) comprising fine particles of an acrylic rubber.

Examples of commercially available products of the core-shell rubber particles that can be used include "Paraloid" EXL-2655 (manufactured by Kureha Corp.) comprising a butadiene-alkyl methacrylate-styrene copolymer, "Stafiloid" AC-3355 or TR-2122 (manufactured by Takeda Pharmaceutical Co., Ltd.) comprising an acrylate-methacrylate copolymer, and "PARALOID" EXL-2611 or EXL-3387 (manufactured by Rohm & Haas) comprising a butyl acrylate-methyl methacrylate copolymer.

Polyamide particles or polyimide particles are preferably used as the thermoplastic resin particles. Examples of commercially available products of the polyamide particles that can be used include SP-500 manufactured by Toray Industries, Inc. and "Orgasol" manufactured by Arkema, Inc.

In the present invention, the organic particles such as rubber particles and thermoplastic resin particles are formulated in an amount of preferably 0.1 to 30 parts by weight, more preferably 1 to 15 parts by weight, with respect to 100 parts by weight in total of the epoxy resins from the viewpoint of allowing the modulus of elasticity and toughness of the obtained cured resin to be compatible with each other.

A kneader, planetary mixer, triple roll, twin-screw extruder, or the like is preferably used in the preparation of the epoxy resin composition of the present invention. The component [C] is kneaded with the component [A] at a temperature of 100° C. or lower. Then, the composition is heated to any temperature of 130 to 180° C. with stirring. At this temperature, the component [C] is then dissolved in the component [A] with stirring. A clear viscous liquid containing the component [C] dissolved in the component [A] is obtained and then cooled to a temperature of preferably 100° C. or lower, more preferably 80° C. or lower, with stirring. After addition of the component [B] and the curing catalyst, the mixture is kneaded. This method hardly causes the coarse separation of the component [C] and is also excellent in the storage stability of the resin composition at room temperature (25° C.). Therefore, the method is preferably used.

The epoxy resins other than the component [A] may be kneaded at any timing. When the epoxy resins other than the component [A] have a boiling point lower than the temperature at which the component [C] is dissolved in the component [A], it is preferred that the epoxy resins other than the component [A] should be kneaded with a solution containing the component [C] dissolved in the component [A] after cooling to a temperature equal to or lower than the boiling point.

The epoxy resin composition of the present invention, when used in prepreg applications, has viscosity of preferably 0.1 to 200 Pa·s at 80° C. from the viewpoint of processability such as tackiness and drapability. The viscosity described herein refers to a complex viscoelastic modulus $\eta^*$ measured at a frequency of 0.5 Hz by simple heating at a heating rate of 2° C./min using a dynamic viscoelastic measurement apparatus (Rheometer RDA2, manufactured by Rheometric Scientific Inc.) and parallel plates of 40 mm in diameter at a gap of 1 mm.

The toughness (KIc) of a cured resin obtained by curing the epoxy resin composition of the present invention at 135° C. for 2 hours is preferably between 1.0 MPa·cm$^{-1}$ and 2.8 MPa·cm$^{-1}$ inclusive, more preferably between 1.2 MPa·cm$^{-1}$ and 2.8 MPa·cm$^{-1}$ inclusive. When the toughness (KIc) in an opening mode is less than 1.0 MPa, impact resistance may be insufficient. When the toughness (KIc) exceeds 2.8 MPa·cm$^{-1}$, a rough cutting surface may be caused in the cutting work of the resulting fiber-reinforced composite material.

In a cured article of the epoxy composition of the present invention, island-like phase separation is seen, which is not observed in an uncured article. This phase separation is attributed to the phase separation, during curing, of the segment having low compatibility with the epoxy resin, of the segments constituting the block copolymer as the component [C]. It is preferred that the average major axis of this phase separation should be between 10 nm and 1000 nm inclusive.

Coarse phase separation having an average major axis exceeding 1000 nm has a structure larger in size than the gap between fibers, when the epoxy resin composition is actually combined with carbon fibers. Thus, the toughness of the cured resin may hardly be reflected in the mechanical properties of the resulting fiber-reinforced composite material as shown in the Charpy impact test or test of residual compressive strength after impact. Thus, the size of phase separation is more preferably 850 nm or less, even more preferably 600 nm or less. Moreover, when the average major axis is less than 10 nm, the effect of improving toughness may hardly be obtained. Thus, the average major axis is more preferably 15 nm or more. This phase separation structure can be observed by observing the cross section of a cured resin using a scanning electron microscope or transmission electron microscope. The cross section may be stained with osmium, if necessary. This staining is performed by a usual method. When this phase separation structure is elliptical in shape, the major axis is used. When the phase separation structure is indefinite in shape, the diameter of a circle circumscribing the structure is used. Alternatively, when the phase separation structure takes two or more layers of circles or ellipses, the diameter of the circle or the major axis of the ellipse in the outermost layer is used.

The reinforcing fiber used in the fiber-reinforced composite material of the present invention is preferably, for example, a glass, carbon, graphite, aramid, boron, alumina, or silicon carbide fiber. Two or more of these fibers may be mixed for use. However, a carbon or graphite fiber may be used for obtaining a molded product having a lighter weight and higher durability. In the present invention, carbon or graphite fibers of various types can be used according to applications. The carbon or graphite fiber has a tensile modulus of preferably 150 to 650 GPa, more preferably 200 to 550 GPa, even more preferably 230 to 500 GPa, in a strand tensile test according to the method described in JIS R 7601 (1986), from the viewpoint of obtaining a composite material having excellent impact resistance and high rigidity and mechanical strength.

The form of a reinforcing fiber base composed of the reinforcing fiber is not particularly limited. For example, unidirectionally aligned long fibers, a tow, a fabric, a mat, a knit, a braid, and short chopped fibers less than 10 mm in length are used. The long fibers described herein refer to a substantially 10-mm or longer continuous filament or fiber bundle. Alternatively, the short fibers described herein refer to a fiber bundle cut into a length less than 10 mm. Moreover, a bundle of unidirectionally aligned reinforcing fibers is most suitable particularly for applications that require high specific strength and specific modulus. An easy-to-handle cloth (fabric) having aligned reinforcing fibers is also suitable for the present invention.

The prepreg of the present invention comprises a fiber base impregnated with the epoxy resin composition of the present invention. Examples of methods for impregnation can include a wet method which involves dissolving, for reduction in viscosity, the epoxy resin composition in a solvent such as methyl ethyl ketone or methanol and impregnating the fiber base with the solution, and a hot-melt method (dry method) which involves heating, for reduction in viscosity, the epoxy resin composition and impregnating the fiber base with the resulting epoxy resin composition.

The wet method is a method whereby the reinforcing fiber is impregnated with a solution of the epoxy resin composition and then pulled out thereof, followed by evaporation of the solvent using an oven or the like. The hot-melt method is a method whereby the reinforcing fiber is directly impregnated with the epoxy resin composition having viscosity reduced by heating or whereby film(s) of release paper or the like coated with the epoxy resin composition are temporarily prepared and subsequently put on both sides or one side of the reinforcing fiber, which is in turn impregnated with the resin by hot-pressing. According to the hot-melt method, any solvent remaining in the prepreg is substantially absent. Therefore, the hot-melt method is preferable.

The prepreg has a reinforcing fiber amount of preferably 70 to 2000 g/m² per unit area. When the reinforcing fiber amount is less than 70 g/m², the number of laminates must be increased for obtaining the predetermined thickness during molding into a fiber-reinforced composite material, resulting in complicated procedures. On the other hand, when the reinforcing fiber amount exceeds 2000 g/m², the resulting prepreg tends to have poor drapability. Moreover, the content of the fiber by weight is preferably 30 to 90% by weight, more preferably 35 to 85% by weight, even more preferably 40 to 80% by weight. When the content of the fiber by weight is less than 30% by weight, the advantages of the fiber-reinforced composite material having excellent specific strength and specific modulus may not be obtained due to too a large amount of the resin. Alternatively, calorific power in curing may be too high during molding into a fiber-reinforced composite material. By contrast, when the content of the fiber by weight exceeds 90% by weight, poor impregnation with the resin may be caused. In this case, the obtained composite material may have many voids.

After lamination of the obtained prepreg, pressure is applied to the laminate, while the resin is cured by heating. By such a method, the composite material according to the present invention is prepared.

In this context, for example, a press molding, autoclave molding, bag molding, wrapping tape, or internal pressure molding method is adopted as a method for applying heat and pressure.

The wrapping tape method is a method whereby the prepreg is wound around a cored bar such as a mandrel and molded into a fiber-reinforced composite article in a cylindrical form. This method is suitable for preparing rod-like forms such as golf shafts and fishing rods. More specifically, the prepreg is wound around the mandrel, and a wrapping tape made of a thermoplastic film for fixing the prepreg and applying pressure thereto is further wrapped around the prepreg. In this method, the resin is cured by heating in an oven, and the cored bar is then pulled out thereof to obtain a cylindrical form.

Alternatively, the internal pressure molding method is a method whereby a preform prepared by winding the prepreg around an internal pressure application body such as a tube made of a thermoplastic resin is set in a mold, and a pressure is subsequently applied thereto by introducing high-pressure gas into the internal pressure application body, while the mold is heated for molding. This method is preferably used for molding complicated forms such as golf shafts, bats, and tennis or badminton rackets.

The fiber-reinforced composite material of the present invention has a glass transition temperature of preferably 100 to 180° C., more preferably 100 to 140° C., measured using a differential scanning calorimeter (DSC). When the glass transition temperature is higher than 180° C., thermal stress remaining in the fiber-reinforced composite material may be increased or a cured article may be fragile. Thus, the obtained fiber-reinforced composite material may have reduced strength properties. When the glass transition temperature is lower than 100° C., the resin softened by heat may clog a polishing machine for polishing the surface of the molded fiber-reinforced composite material or the fiber-reinforced composite material may be thermally deformed in use as a material.

The fiber-reinforced composite material obtained using a cured article of the epoxy resin composition of the present invention as a matrix resin is preferably used in sport, general industrial, and aerospace applications. More specifically, the fiber-reinforced composite material is preferably used in sport applications such as golf shafts, fishing rods, tennis or badminton rackets, hockey sticks, and ski poles. Furthermore, the fiber-reinforced composite material is preferably used in general industrial applications such as structural materials for mobile objects such as automobiles, ships, and rail cars, drive shafts, flat springs, windmill blades, pressure vessels, flywheels, rollers for paper-making, roofing, cables, and repairing/reinforcing materials.

The fiber-reinforced composite article in a cylindrical form obtained by curing the prepreg of the present invention in a cylindrical form can be used preferably in golf shafts, fishing rods, etc.

BRIEF DESCRIPTION OF THE DRAWING

FIG. 1 is a diagram schematically showing the torsion test of a shaft.

This description includes part or all of the contents as disclosed in the description of Japanese Patent Application No. 2006-180990, which is a priority document of the present application.

EXAMPLES

Hereinafter, the present invention will be described more specifically with reference to Examples. Various physical properties were measured according to methods shown below. In this context, these physical properties were measured in an environment having a temperature of 23° C. and a relative humidity of 50%, unless otherwise specified.

(1) Preparation of Epoxy Resin Composition

Predetermined amounts of components except for a curing agent and a curing accelerator were added into a kneader and heated to 160° C. with kneading. The mixture was kneaded at 160° C. for 1 hour to thereby obtain a clear viscous liquid. The liquid was cooled to 80° C. with kneading. After addition of predetermined amounts of the curing agent and the curing accelerator, the mixture was kneaded to obtain an epoxy resin composition. The proportions of the components formulated in each Example or Comparative Example are as shown in Table 1. In this context, the molecular weights, etc., of the raw materials used here are as shown below.

<Epoxy Resin>
bisphenol A-type epoxy resin ("Epikote" 828, molecular weight: approximately 370, both melting point and glass transition temperature: 25° C. or lower, manufactured by Japan Epoxy Resin Co., Ltd.)
bisphenol A-type epoxy resin ("ARALDITE" LY566, molecular weight: approximately 383, both melting point and glass transition temperature: 25° C. or lower, manufactured by Huntsman Advanced Materials)
bisphenol A-type epoxy resin ("Epikote" 1001, glass transition temperature: 64° C., molecular weight: approximately 900, manufactured by Japan Epoxy Resin Co., Ltd.)
bisphenol A-type epoxy resin ("Epikote" 1004AF, glass transition temperature: 97° C., molecular weight: approximately 1650, manufactured by Japan Epoxy Resin Co., Ltd.)
bisphenol A-type epoxy resin ("Epikote" 1007, glass transition temperature: 128° C., molecular weight: approximately 2900, manufactured by Japan Epoxy Resin Co., Ltd.)
bisphenol F-type epoxy resin ("Epikote" 807, molecular weight: 340, both melting point and glass transition temperature: 25° C. or lower, manufactured by Japan Epoxy Resin Co., Ltd.)
bisphenol F-type epoxy resin ("Epikote" 4002P, glass transition temperature: 70° C., molecular weight: approximately 900, manufactured by Japan Epoxy Resin Co., Ltd.)
bisphenol F-type epoxy resin ("Epikote" 4004P, glass transition temperature: 85° C., molecular weight: approximately 1600, manufactured by Japan Epoxy Resin Co., Ltd.)
biphenyl-type epoxy resin ("Epikote" YX4000H, molecular weight: approximately 380, melting point: 105° C., manufactured by Japan Epoxy Resin Co., Ltd.)
dicyclopentadiene-type epoxy resin ("Epiclon" HP7200L, glass transition temperature: 55° C., manufactured by Dainippon Ink & Chemicals Inc.)

<Curing Agent>
dicyandiamide (DICY7, manufactured by Japan Epoxy Resin Co., Ltd.)
4,4'-diaminodiphenyl sulfone <Curing Accelerator>
3-(3,4-dichlorophenyl)-1,1-dimethylurea (DCMU99, manufactured by Hodogaya Chemical Co., Ltd.)
toluene bisdimethylurea (Omicure 24, manufactured by CVC Specialty Chemicals, Inc.)

<Block Copolymer>
S-B-M copolymer (S represents styrene (Tg: 90° C.), B represents 1,4-butadiene (Tg: −90° C.), M represents methyl methacrylate (Tg: 130° C.), "Nanostrength" (registered trademark) E40F, manufactured by Arkema, Inc.)
S-B-M copolymer (S represents styrene (Tg: 90° C.), B represents 1,4-butadiene (Tg: −90° C.), M represents methyl methacrylate (Tg: 130° C.), "Nanostrength" (registered trademark) E20F, manufactured by Arkema, Inc.)
M-B-M copolymer (B represents butyl acrylate (Tg: −54° C.), M represents methyl methacrylate (Tg: 130° C.), "Nanostrength" M22, manufactured by Arkema, Inc.)

<Thermoplastic Resin>
polyvinyl formal ("Vinylec" K, manufactured by Chisso Corp.)

(2) Viscosity Measurement of Uncured Resin

The viscosity of an uncured article of an epoxy resin composition was measured at a frequency of 0.5 Hz by simple heating at a heating rate of 2° C./min using a dynamic viscoelastic measurement apparatus (Rheometer RDA2, manufactured by Rheometric Scientific Inc.) and parallel plates of 40 mm in diameter at a gap of 1 mm.

(3) Toughness Test Method of Cured Resin

An uncured resin composition was degassed in a vacuum and then cured at a temperature of 130° C. for 2 hours in a mold set to a thickness of 6 mm using a Teflon (registered trademark) spacer of 6 mm in thickness to obtain a cured resin of 6 mm in thickness. This cured resin was cut into 12.7×150 mm to obtain a test piece. The test piece was processed according to ASTM D5045 using Instron Universal Testing Machine (manufactured by Instron Corp.) and subjected to the experiment. A starter crack was introduced in the test piece by putting a razor blade cooled to the liquid nitrogen temperature on the test piece and tapping a hammer on the blade. The toughness of the cured resin described herein refers to critical stress intensity under mode I deformation (opening mode).

(4) Bending Test of Cured Resin

An uncured resin composition was degassed in a vacuum and then cured at a temperature of 130° C. for 2 hours in a mold set to a thickness of 2 mm using a "Teflon (registered trademark)" spacer of 2 mm in thickness to obtain a cured resin of 2 mm in thickness. This cured resin was cut into 10±0.1 mm in width×60±1 mm in length to obtain a test piece. The test piece was measured by 3-point bending at a span of 32 mm according to JIS K7171 (1994) using Instron Universal Testing Machine (manufactured by Instron Corp.) to determine a flexural deflection. The measurement was conducted at two temperatures, room temperature (25° C.) and 0° C. The number of measurements was n=5, and an average thereof was determined.

(5) Size of Phase Separation

The fracture surface of the sample after the test of the paragraph (3) was photographed in the range of 4.5×6.0 μm around the tip of the crack using a scanning electron microscope (SEM) under conditions shown below.

Apparatus: S-4100 scanning electron microscope (manufactured by Hitachi, Ltd.)
Acceleration voltage: 3 kV
Vapor deposition: Pt-Pd, approximately 4 μm
Magnification: 20,000 times or more From these samples, all the major axes of islands having phase separation were measured to thereby obtain a phase separation size from an average thereof.

(6) Preparation of Prepreg

A resin composition was applied onto release paper using a reverse roll coater to prepare a resin film. Next, two resin films were respectively put on both sides of carbon fiber Torayca (registered trademark) T800H (manufactured by Toray Industries, Inc.) unidirectionally aligned in a sheet form, which was in turn impregnated with the resin composition by hot-pressing to prepare a unidirectional prepreg having a carbon fiber weight of 125 g/m$^2$ per unit area and a fiber content of 75% by weight.

(7) Charpy Impact Test of Fiber-Reinforced Composite Material

The Charpy impact value of a fiber-reinforced composite material was measured as an index for impact resistance. Sheets of the unidirectional prepreg were laminated in the same fiber direction to obtain a laminate of approximately 3 mm in thickness. The laminate was cured by hot-pressing in an autoclave at 135° C. under an internal pressure of 588 kPa for 2 hours and molded into a unidirectional fiber-reinforced composite material. The unidirectional fiber-reinforced composite material was cut into 3±0.2 mm in thickness×10±0.2 mm in width×80 mm in length to prepare a test piece. The test piece was subjected to the Charpy impact test according to JIS K7077 (1991) under a flat-wise impact of 300 kg·cm in terms of weighing. In this context, no notch was introduced in the test piece. The number of measurements was n=5, and an average thereof was calculated.

(8) Glass Transition Temperature

The test piece of the paragraph (7) was used to measure a glass transition temperature. A temperature at the midpoint of glass transition determined using a differential scanning calorimeter (DSC) according to JIS K7121 (1987) was used as the glass transition temperature. Measurement conditions involved simple heating from 0° C. to 350° C. at a heating rate of 10° C./min in a nitrogen atmosphere.

(9) Preparation of Composite Article in Tube Form

A composite article in a cylindrical form having lamination configuration of [0$_3$/±45$_3$] in the axial direction of the cylinder and an inside diameter of 6.3 mm was prepared by steps (a) to (e) shown below. In this context, a stainless round bar of 6.3 mm in diameter and 1000 mm in length was used as a mandrel.

(a) A unidirectional prepreg prepared according to the paragraph (6) was cut into two rectangular forms of 68 mm in length×720 mm in width (such that the axial direction of the fibers formed a 45-degree angle with the direction of the long side). These two prepreg sheets were glued together such that their fiber directions intersected with each other and they were displaced 10 mm (corresponding to the semiperimeter of the mandrel) in the short side direction.

(b) The glued prepreg sheet was wound around a releasable mandrel such that the long side of the rectangular form of the prepreg was oriented in the same direction as the axial direction of the mandrel.

(c) A prepreg obtained according to the paragraph (6) was cut into a rectangular form of 80 mm in length×720 mm in width (the long side direction was the same as the axial direction of the fibers), and this prepreg sheet was further wound around the prepreg on the mandrel such that its fiber direction was the same as the axial direction of the mandrel.

(d) A wrapping tape (heat-resistant film tape) was further wrapped around the prepreg wound around the mandrel to cover it, and the resulting product was molded by heating at 130° C. for 90 minutes in a curing oven.

(e) Then, the mandrel was pulled out thereof, and the wrapping tape was removed to obtain a composite article in a cylindrical form.

(10) Charpy Impact Test of Composite Article in Tube Form

The composite article in a cylindrical form obtained in the paragraph (9) was cut into 60 mm to obtain a test piece of 6.3 mm in inside diameter and 60 mm in length. The test piece was subjected to the Charpy impact test by giving an impact of 300 kg·cm in terms of weighing to the side of the cylindrical form. An absorbed impact energy was calculated from the angle of upward swing according to the following formula:

$$E = WR[(\cos\beta - \cos\alpha) - (\cos\alpha' - \cos\alpha)(\alpha+\beta)/(\alpha+\alpha')],$$

wherein

E: absorbed energy (J)
WR: moment around axis of hammer rotation (N·m)
α: angle (°) of hammer lift
α': angle (°) of upward swing from the hammer lift angle α when the hammer does not strike the test piece
β: angle (°) of upward swing of hammer after test piece breakage.

In this context, no notch was introduced in the test piece. The number of measurements was n=5, and an average thereof was calculated. Moreover, the samples after the Charpy test were observed. If any unbroken sample remained, the result was judged as not broken. The term "not broken" described herein means that the cylindrical form loses its own rigidity due to the impact added thereto (i.e., regarded as apparently broken in the Charpy test), but its fiber bundles are not completely cut and are joined together.

(11) Torsion Strength Test of Composite Article in Tube Form

The composite article in a cylindrical form obtained in the paragraph (9) was cut into a test piece of 350 mm in length. Each test piece was subjected to a C-type shaft (non-metallic shafts such as fiber-reinforced plastic shafts) test according to the method described in "Approval Standard and Standard Confirmation Method for Shafts for Golf-Club" (ed. by the Consumer Product Safety Association, Ministry for International Trade and Industry Approval 5-San No. 2087, 1993) until breakage. The torsion test was conducted as shown in FIG. 1. Both ends (50 mm) of the test piece of the composite article in a cylindrical form having a gage length of 250 mm were clamped by fixtures. Torsion strength was determined according to the following formula:

Torsion strength (N·m·deg)=breakdown torque (N·m)× angle of torsion at break (deg).

An epoxy resin composition, a prepreg, a fiber-reinforced composite material, and a fiber-reinforced composite article in a cylindrical form were prepared in each Example or Comparative Example according to the methods and measured for their properties. The results are summarized in Tables 1 and 2.

From the comparison among Examples 1 to 12 and Comparative Examples 1, 2, and 4, it has been demonstrated that the component [A] decreases a phase separation size and improves the impact resistance of the resulting fiber-reinforced composite material. From the comparison among Examples 5 and 9 and Comparative Example 3, it has been demonstrated that the component [C] formulated therein improves the toughness of the cured resin and the impact resistance of the fiber-reinforced composite material.

From the comparison between Example 12 and Comparative Example 5, it has been demonstrated that the component [C] formulated therein instead of a thermoplastic resin polyvinyl formal significantly improves torsion strength.

TABLE 1

| | Name of raw material | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| [A] | Epikote 1001 | 40 | | | | | | | | | 40 | | |
| | Epikote 1004AF | | 40 | | | | | | | | | 40 | |
| | Epikote 1007 | | | | 40 | | 40 | 20 | 40 | | | | |
| | Epikote 4002P | | | | | | | | | | | | 40 |
| | Epikote 4004P | | | 50 | | 40 | | | | 40 | | | |
| [B] | Dicyandiamide | 5.5 | 5.5 | 5.3 | 5.3 | 5.5 | 5.3 | 5.5 | 5.3 | 5.3 | 5.5 | 5.3 | 5 |
| [C] | Nanostrength E40F | 3 | | | 3 | | | | 5 | | | | |
| | Nanostrength E20F | | | 3 | | 3 | | | | 5 | 7 | | |
| | Nanostrength M22 | | 3 | | | | 3 | 5 | | | | 7 | 5 |
| Others | DCMU | 3 | | 3 | 3 | 3 | 3 | 3 | 3 | 3 | 3 | 3 | 3 |
| | Omicure24 | | 3 | | | | | | | | | | |
| | Diaminodiphenyl sulfone | | | | | | | | | | | | |
| | Epikote 828 | 30 | | 25 | 30 | 20 | 40 | 60 | 60 | 50 | 30 | 40 | |
| | Epikote 807 | 30 | 40 | 25 | | | | | | | 30 | 20 | 40 |
| | Epikote YX4000H | | 20 | | 30 | 40 | 20 | 20 | | 10 | | | 20 |
| | Epiclon HP7200L | | | | | | | | | | | | |
| Physical properties of resin | Viscosity (@80° C.) | 1.2 | 6 | 7 | 25 | 5 | 23 | 10 | 48 | 12 | 6 | 20 | 10 |
| | Resin toughness (KIc) | 1.5 | 1.6 | 1.6 | 1.7 | 1.6 | 1.7 | 2 | 2.1 | 2 | 2.3 | 2.4 | 2.1 |
| | Flexural deflection (room temperature) | 12 | 16 | 20 | 15 | 14 | 16 | 15 | 13 | 15 | 12 | 15 | 12 |
| | Flexural deflection (0° C.) | 10 | 14 | 16 | 13 | 12 | 14 | 13 | 12 | 13 | 9 | 13 | 10 |
| | Phase separation structure (nm) | 800 | 200 | 400 | 300 | 500 | 150 | 350 | 300 | 500 | 900 | 150 | 200 |
| Physical properties of composite | Charpy impact value (J/m) | 151 | 163 | 155 | 165 | 154 | 166 | 164 | 168 | 157 | 155 | 170 | 160 |
| | Glass transition temperature | 125 | 125 | 104 | 113 | 106 | 113 | 120 | 114 | 108 | 123 | 123 | 105 |
| Composite article in tube form | Charpy impact value (J) | 11.0 | 12.1 | 11.6 | 11.8 | 11.3 | 12.0 | 12.0 | 12.3 | 11.5 | 11.1 | 12.5 | 12 |
| | Presence or absence of breakage | Absent | Absent | Absent | Absent | Absent | Absent | Absent | Absent | Absent | Absent | Absent | Absent |
| | Torsion of cylinder (N · m · deg) | 3100 | 3300 | 3200 | 3300 | 3100 | 3300 | 3400 | 3400 | 3200 | 3200 | 3400 | 3350 |

TABLE 2

| | Name of raw material | Comparative Example 1 | Comparative Example 2 | Comparative Example 3 | Comparative Example 4 | Comparative Example 5 |
|---|---|---|---|---|---|---|
| [A] | Epikote 1001 | | | | | |
| | Epikote 1004AF | | | | | |
| | Epikote 1007 | | | | | |
| | Epikote 4002P | | | | | 40 |
| | Epikote 4004P | | | 40 | | |
| [B] | Dicyandiamide | 5.5 | 5.5 | 5.5 | 5.5 | 5 |
| [C] | Nanostrength E40F | | | | | |
| | Nanostrength E20F | | 3 | | | |
| | Nanostrength M22 | | | | 3 | 3 |

TABLE 2-continued

| | Name of raw material | Comparative Example 1 | Comparative Example 2 | Comparative Example 3 | Comparative Example 4 | Comparative Example 5 |
|---|---|---|---|---|---|---|
| Others | DCMU | 3 | 3 | 3 | 3 | 3 |
| | Omicure24 | | | | | |
| | Diaminodiphenyl sulfone | | | | | |
| | Epikote 828 | 60 | 30 | 20 | | |
| | LY556 | | | | 100 | |
| | Epikote 807 | | 30 | | | 40 |
| | Epikote YX4000H | | 40 | 40 | | 20 |
| | Epiclon HP7200L | 40 | | | | |
| | Vinylec K | | | | | 5 |
| Physical properties of resin | Viscosity (@80° C.) | 0.5 | 0.5 | 0.2 | 0.5 | 12 |
| | Resin toughness (KIc) | 1.5 | 1.4 | 1 | — | 1 |
| | Flexural modulus (room temperature) | 7.1 | 8 | 20 | 3 | 21 |
| | Flexural modulus (0° C.) | 4.5 | 4 | 12 | 2 | 10 |
| | Phase separation structure (nm) | 1500 | 2000 | Absent | 2000 | Absent |
| Physical properties of composite | Charpy impact value (J/m) | 125 | 120 | 115 | 120 | 125 |
| | Glass transition temperature | 130 | 140 | 103 | 140 | 95 |
| Composite article in tube form | Charpy impact value (J) | 9.3 | 9.5 | 9.3 | 9.3 | 8.4 |
| | Presence or absence of breakage | Present | Present | Present | Present | Present |
| | Torsion of cylinder (N · m · deg) | 2750 | 2700 | 2800 | 2600 | 2850 |

All publications, patents, and patent applications cited herein are incorporated herein by reference in their entirety.

Industrial Applicability

An epoxy resin composition of the present invention causes no coarse phase separation during curing. In addition, the epoxy resin composition of the present invention is excellent in toughness without reduction in heat resistance and excellent in processability for obtaining a prepreg. Therefore, the epoxy resin composition can be combined with a reinforcing fiber to thereby obtain a prepreg. This prepreg can be cured to thereby obtain a fiber-reinforced composite material having excellent impact resistance. The obtained fiber-reinforced composite material is excellent in impact strength as shown in the Charpy impact test. The fiber-reinforced composite material obtained by the present invention is preferably used in sport, general industrial, and aerospace applications.

The invention claimed is:

1. An epoxy resin composition comprising the following [A], [A'], [B], and [C]:
   [A] a bisphenol A epoxy resin or a bisphenol F epoxy resin having a glass transition temperature or melting point of 50° C. or higher;
   [A'] an epoxy resin which is in a liquid state at 25° C.;
   [B] an epoxy resin curing agent; and
   [C] at least one block copolymer selected from the group consisting of S-B-M, and M-B-M, wherein the blocks are linked to each other by a covalent bond or by an intermediate molecule bound to one of the blocks via one covalent bond formation and to the other block via another covalent bond formation; the block M is a methyl methacrylate homopolymer or a copolymer comprising at least 50% by weight of methyl methacrylate; the block B is incompatible with the block M and has a glass transition temperature of 20° C. or lower; and the block S is incompatible with the blocks B and M and has a glass transition temperature higher than that of the block B; and wherein the epoxy resin composition comprises 10 to 60 parts by weight of the component [A] with respect to 100 parts by weight in total of epoxy resins; 1 to 15 parts by weight of the component [B] with respect to 100 parts by weight in total of epoxy resins; 1 to 15 parts by weight of the component [C] with respect to 100 parts by weight in total of epoxy resins; and 10 to 90 parts by weight of the component [A'] with respect to 100 parts by weight in total of epoxy resins.

2. The epoxy resin composition according to claim 1, wherein the component [B] is dicyandiamide or a derivative thereof.

3. The epoxy resin composition according to claim 1, wherein the component [A] has a molecular weight between 700 and 10000 inclusive.

4. The epoxy resin composition according to claim 1, wherein the size of phase separation caused by curing the epoxy resin composition at 135° C. for 2 hours is between 10 nm and 1000 nm inclusive.

5. A prepreg comprising a fiber base impregnated with an epoxy resin composition according to claim 1.

6. A fiber-reinforced composite material obtained by curing a prepreg according to claim 5.

7. A fiber-reinforced composite article in a cylindrical form obtained by curing a prepreg according to claim 5 in a cylindrical form.

8. The epoxy resin composition according to claim 1, wherein the component [A'] is a bisphenol A epoxy resin which is in a liquid state at 25° C., or a bisphenol F epoxy resin which is in a liquid state at 25° C.

9. The epoxy resin composition according to claim 8, wherein the component [B] is dicyandiamide or a derivative thereof.

10. The epoxy resin composition according to claim 8, wherein block B in the component [C] is a polydiene selected from the group consisting of polybutadiene, polyisoprene, random copolymers thereof, and partially or completely hydrogenated forms thereof; and wherein the block S in the component [C] is obtained from an aromatic vinyl compound or from alkyl acrylate and/or methacrylate having 1 to 18 carbon atoms in the alkyl chain.

11. The epoxy resin composition according to claim 9, wherein block B in the component [C] is a polydiene selected from the group consisting of polybutadiene, polyisoprene, random copolymers thereof, and partially or completely hydrogenated forms thereof; and wherein the block S in the component [C] is obtained from an aromatic vinyl compound or from alkyl acrylate and/or methacrylate having 1 to 18 carbon atoms in the alkyl chain.

* * * * *